(12) United States Patent
Schultheiss et al.

(10) Patent No.: US 11,540,504 B2
(45) Date of Patent: Jan. 3, 2023

(54) TREE STAND LIFT SYSTEM

(71) Applicants: Joel Schultheiss, Hudson, WI (US); Christopher Schultheiss, Sioux Falls, SD (US)

(72) Inventors: Joel Schultheiss, Hudson, WI (US); Christopher Schultheiss, Sioux Falls, SD (US)

( * ) Notice: Subject to any disclaimer, the term of this patent is extended or adjusted under 35 U.S.C. 154(b) by 470 days.

(21) Appl. No.: 16/677,114

(22) Filed: Nov. 7, 2019

(65) Prior Publication Data
US 2020/0138009 A1   May 7, 2020

Related U.S. Application Data

(60) Provisional application No. 62/756,973, filed on Nov. 7, 2018.

(51) Int. Cl.
| | |
|---|---|
| *A01M 31/02* | (2006.01) |
| *A63B 27/00* | (2006.01) |
| *B66D 3/18* | (2006.01) |
| *B66D 3/26* | (2006.01) |
| *B66C 23/20* | (2006.01) |
| *E04G 3/32* | (2006.01) |

(52) U.S. Cl.
CPC ............ *A01M 31/02* (2013.01); *A63B 27/00* (2013.01); *B66C 23/203* (2013.01); *B66D 3/18* (2013.01); *B66D 3/26* (2013.01); *E04G 3/32* (2013.01); *B66D 2700/025* (2013.01)

(58) Field of Classification Search
CPC ...... A01M 31/02; A63B 27/00; B66C 23/203; B66D 3/18; B66D 3/26; B66D 2700/025; E04G 3/32

USPC .................. 182/9, 129, 130, 148, 187, 188
See application file for complete search history.

(56) References Cited

U.S. PATENT DOCUMENTS

| | | | | |
|---|---|---|---|---|
| 2,153,803 | A * | 4/1939 | Jerabek | B66C 23/203 |
| | | | | 212/179 |
| 2,245,977 | A * | 6/1941 | Houk | B66D 3/04 |
| | | | | 248/230.4 |
| 5,607,143 | A * | 3/1997 | Regal | B66D 1/60 |
| | | | | 254/362 |
| RE36,276 | E * | 8/1999 | Smith | A01M 31/02 |
| | | | | 182/136 |
| 6,241,045 | B1 * | 6/2001 | Reeve | A62B 35/0093 |
| | | | | 182/9 |
| 6,695,688 | B1 * | 2/2004 | Owen | A22B 5/06 |
| | | | | 452/187 |
| 7,191,732 | B2 * | 3/2007 | Neal, Jr. | A01K 5/0225 |
| | | | | 119/51.01 |
| 7,913,980 | B1 * | 3/2011 | Cipriano | B66D 3/08 |
| | | | | 452/187 |
| 10,912,293 | B1 * | 2/2021 | Miller | A01M 31/02 |
| 2004/0140158 | A1 * | 7/2004 | Wilcox | A01M 31/02 |
| | | | | 182/187 |

(Continued)

*Primary Examiner* — Robert Canfield
(74) *Attorney, Agent, or Firm* — Pauly, DeVries Smith & Deffner LLC

(57) ABSTRACT

The present application is directed to a tree stand lift system for elevating a person into a tree or other structure. The tree stand lift system includes, in an embodiment, a hunting platform assembly for supporting a person; a hoist assembly positioned above the platform; a hoist cable secured to the hoist assembly and positioned to lift a person from the ground up to the platform.

14 Claims, 15 Drawing Sheets

(56) References Cited

U.S. PATENT DOCUMENTS

| | | | | |
|---|---|---|---|---|
| 2005/0242051 | A1* | 11/2005 | Porebski | B66C 23/203 |
| | | | | 212/179 |
| 2007/0089932 | A1* | 4/2007 | Boyett | A01M 31/02 |
| | | | | 182/133 |
| 2007/0095611 | A1* | 5/2007 | Oertwig | A01M 31/02 |
| | | | | 182/142 |
| 2007/0138359 | A1* | 6/2007 | Johnson | A22B 5/06 |
| | | | | 248/218.4 |
| 2009/0272709 | A1* | 11/2009 | Nessner | B66D 3/04 |
| | | | | 212/270 |
| 2010/0032238 | A1* | 2/2010 | Northburg | A63B 27/00 |
| | | | | 182/136 |
| 2011/0260127 | A1* | 10/2011 | Surgeon | B66D 3/26 |
| | | | | 254/362 |
| 2012/0007029 | A1* | 1/2012 | Place | A01M 31/02 |
| | | | | 254/1 |
| 2013/0302131 | A1* | 11/2013 | Nessner | A01M 31/02 |
| | | | | 414/800 |
| 2014/0264213 | A1* | 9/2014 | Nipper | A01M 31/02 |
| | | | | 254/390 |
| 2019/0104728 | A1* | 4/2019 | Howell, Jr. | A01K 5/00 |
| 2019/0336828 | A1* | 11/2019 | Hines | A01M 31/02 |
| 2020/0068872 | A1* | 3/2020 | Howell, Jr. | A01K 5/00 |
| 2021/0029986 | A1* | 2/2021 | Bouchard | E04G 3/32 |

\* cited by examiner

TREE STAND LIFT SYSTEM

This application is a non-provisional application claiming priority to U.S. Provisional Application No. 62/756,973, filed Nov. 7, 2018, and the entire contents of which is incorporated herein by reference.

FIELD

The present application is directed to a tree stand system, in particular, a tree stand system for allowing easier and safer access to elevated tree stands, such as deer hunting stands.

BACKGROUND

Platforms are often installed in trees for hunting, such as hunting deer. These platforms, often called "tree stands" or "deer stands", generally include at least some sort of platform from which a person can observe game from a distance while staying out of typical fields of view of the game being hunted. The height of the platforms within a tree varies based upon numerous factors, including the types of tree, where branches are located on the tree, and surrounding topography and vegetation. Often the platform is located ten to fifteen feet up off the ground, and is reachable by a ladder.

The tree stands can be homemade or purchased premade. The homemade tree stands can be a simple platform made of plywood, all the way up to a relatively elaborate stand with room for two or more people and some sort of enclosed blind. Purchased tree stands are also variable in terms of size and materials, with many purchased tree stands designed for portable use where they can be moved from location to location. For example, the portable tree stand may be a relatively simple platform to which a ladder is attached.

One problem with existing tree stands is that it can be difficult for some people to climb into the tree stand by means of a ladder. People with limited mobility may be unable to use a ladder, such as veterans who have been injured, disabled people with limited mobility, or senior citizens with limited strength. The problem of climbing into a tree stand is compounded by two significant factors: First, hunting typically involves bringing a significant amount of gear up into the stand, including at a minimum a gun or a bow and arrows. Add on ammunition, water, warm clothes, etc. and the total weight that must be carried up to the tree stand is significant. Second, the irregularity of trees, surrounding vegetation, and surrounding terrain can all complicate the positioning and arrangement of the stand and ladder. For example, a limited set of challenges includes having ladders that do not quite reach the full way up to the stand, ladders that reach the stand but won't securely attach for various reasons (the stand it not flat, the ladder can't be optimally angled, etc.), ladders that only contact the ground at one of two sides (thereby wobbly), stands are positioned with close-hanging branches that limit how to get on and off the ladder, etc. In addition, weather can be a challenge—much hunting occurs in the fall and winter when it is cold outside, meaning that hunters are wearing large and/or heavy boots, glove or mittens, and bulky clothing. This apparel can make it more difficult to move and climb up to the tree stand, along with difficulty in moving around on the tree stand.

Therefore, a need exists for an improved tree stand, in particular one that allows a hunter to easily access the tree stand and to stay safe while hunting from the tree stand.

SUMMARY OF THE INVENTION

The present disclosure is directed to a tree stand lift system for use in lifting a person and supplies up to an elevated position, typically a position up in a tree, although the system can also be used to lift a person into a structure other than a tree, such as a hunting stand mounted on a pole, an elevated hunting blind, a location for bird watching, etc. The system allows a user to relatively easily and safely be lifted up into a tree stand, such as tree stands used for hunting deer. In use, the tree stand lift system uses a powered hoist to lift a hunter (or other person) wearing a harness up to the elevation of a platform, the platform typically including a seat for the hunter to sit upon while the lifted person is hunting (or undertaking other activity, such as game viewing, bird watching, etc.). The hoist is typically powered by a battery, and the battery in turn can be optionally charged with a small solar panel.

In certain embodiments the powered hoist is mounted on one or more tracks that allow the powered hoist to travel or rotate in a manner to allow a user to be lifted to the side of the tree stand and then pivot or slide over to above the tree stand. This design allows for greater convenience and ease of use.

In addition to being used to lift a person into a tree stand, the present tree stand lift system can be used to lift gear up to an elevated position, such as a tree stand. For example, the tree stand lift system can be used to lift hunting equipment into the tree stand. This hunting equipment can include everything from a gun to extra clothing, pack, food, etc.

In an embodiment the present disclosure is directed to a tree stand lift system for elevating a person into a tree or other structure, the tree stand lift system comprising: a hunting platform assembly for supporting a person; a hoist assembly positioned above the platform; a hoist cable secured to the hoist assembly and positioned to lift a person from the ground up to the platform.

In certain embodiments the platform assembly for supporting a person includes a first platform for standing and a second platform for sitting, the second platform for sitting located above the first platform for standing.

Optionally the second platform for sitting is configured to pivot along an axis so it can make room for standing on the first platform for standing.

The platform assembly for supporting a person typically includes a means for securing the platform assembly to a tree trunk, such as straps.

The hoist assembly generally includes a hoist platform with a roller over which the hoist cable travels.

The hoist assembly can include a hoist platform, and the hoist platform can include mounting brackets for securing the hoist platform to a tree. In some constructions the hoist assembly comprises a hoist platform and the hoist platform includes mounting brackets for securing the hoist platform to a base assembly, the base assembly comprising a means for moving or rotating the hoist platform relative to the hunting platform assembly.

Optionally the hoist platform includes mounting brackets for securing the hoist platform to a base assembly, the base assembly comprising at least one rail on which the hoist platform can travel. The base assembly sometimes includes two rails. The hoist platform can slide along the rails to at least two positions: one above the hunting platform and one to the side of the hunting platform. Typically, the base assembly comprises curved rails, the curved rails configured to at least partially wrap around a tree trunk.

The base assembly can include a means for adjusting the angle at which the base assembly connects to a tree trunk.

In some embodiments the lift assembly further comprises a portable remote-control transmitter and a remote-control receiver, the transmitter and receiver for controlling the movement of the hoist that raises and lowers the hoist cable.

One advantage of the present design is that the hoist cable can further be used as a safety cable, even when the user is seated on their tree stand. For example, once a user is in their tree stand they can stay connected to the hoist, which is able to protect them from falls. It is often desirable to have some slack in the cable in these situations to allow for freedom of movement (such as, but not limited to, being able to move in response to approaching game so as to allow for getting a clear shot of the target). Typically, the amount of slack will be just a few feet or less of hoist cable. It is generally desirable to have enough slack to allow for freedom of movement, but not so much slack that a falling hunter will face too much of a jolt upon the hoist cable becoming engaged.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following drawings, in which.

While embodiments are susceptible to various modifications and alternative forms, specifics thereof have been shown by way of example and drawings and will be described in detail. It should be understood, however, that the scope herein is not limited to the particular embodiments described. On the contrary, the intention is to cover modifications, equivalents, and alternatives falling within the spirit and scope herein.

DETAILED DESCRIPTION

The present application is directed to a tree stand lift system for elevating a person into a tree or other structure. The tree stand lift system includes, in an embodiment, a hunting platform assembly for supporting a person; a hoist assembly positioned above the platform; a hoist cable secured to the hoist assembly and positioned to lift a person from the ground up to the platform.

The present disclosure is directed to a tree stand lift system for use in lifting a person and supplies up to an elevated position, typically a position up in a tree, although the system can also be used to lift a person into a structure other than a tree, such as a hunting stand mounted on a pole, an elevated hunting blind, a location for bird watching, etc.

Figure 1:
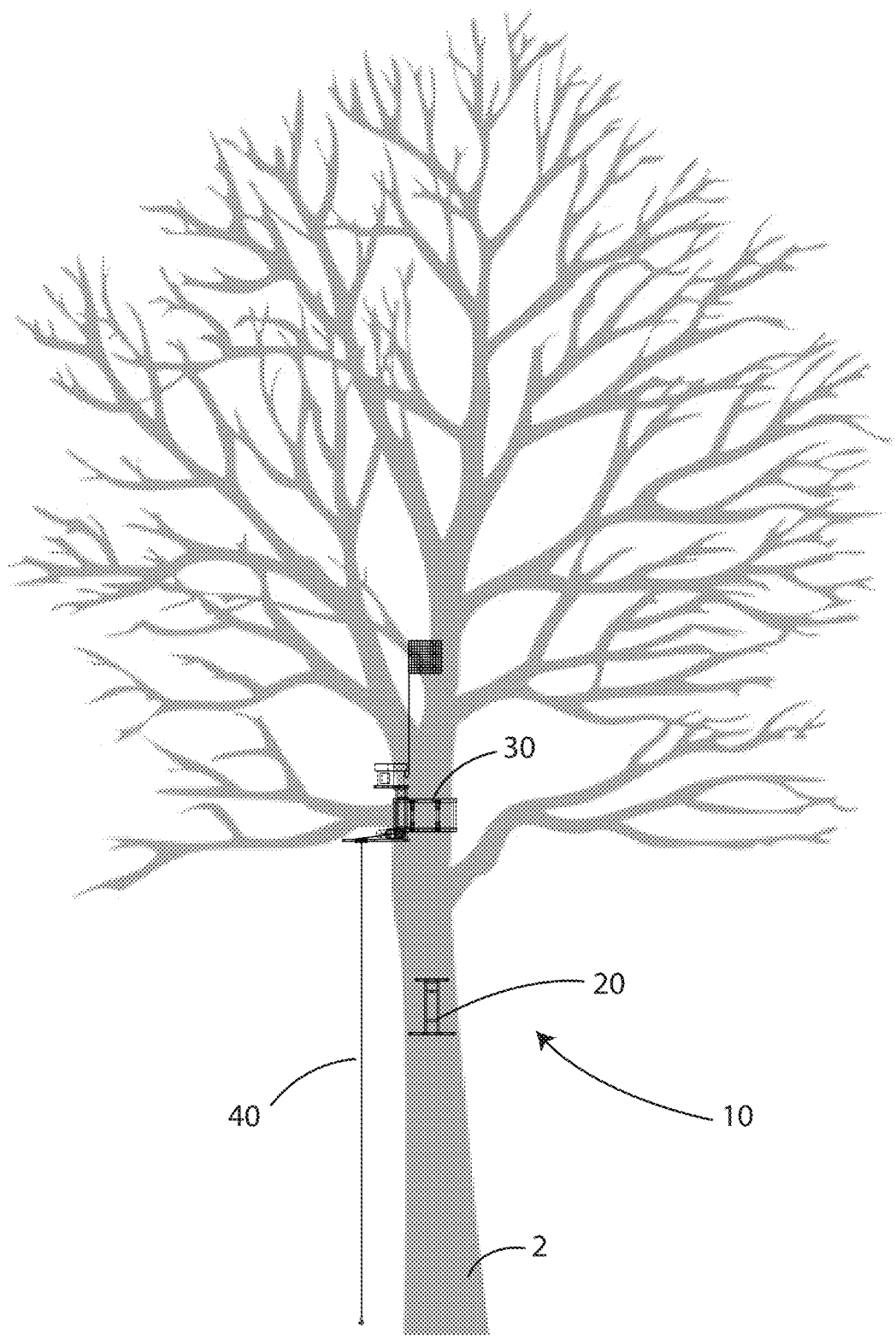
FIG. 1 is a schematic diagram of a tree stand lift system installed in a tree, showing a hoist cable in a descended position.
Figure 2:
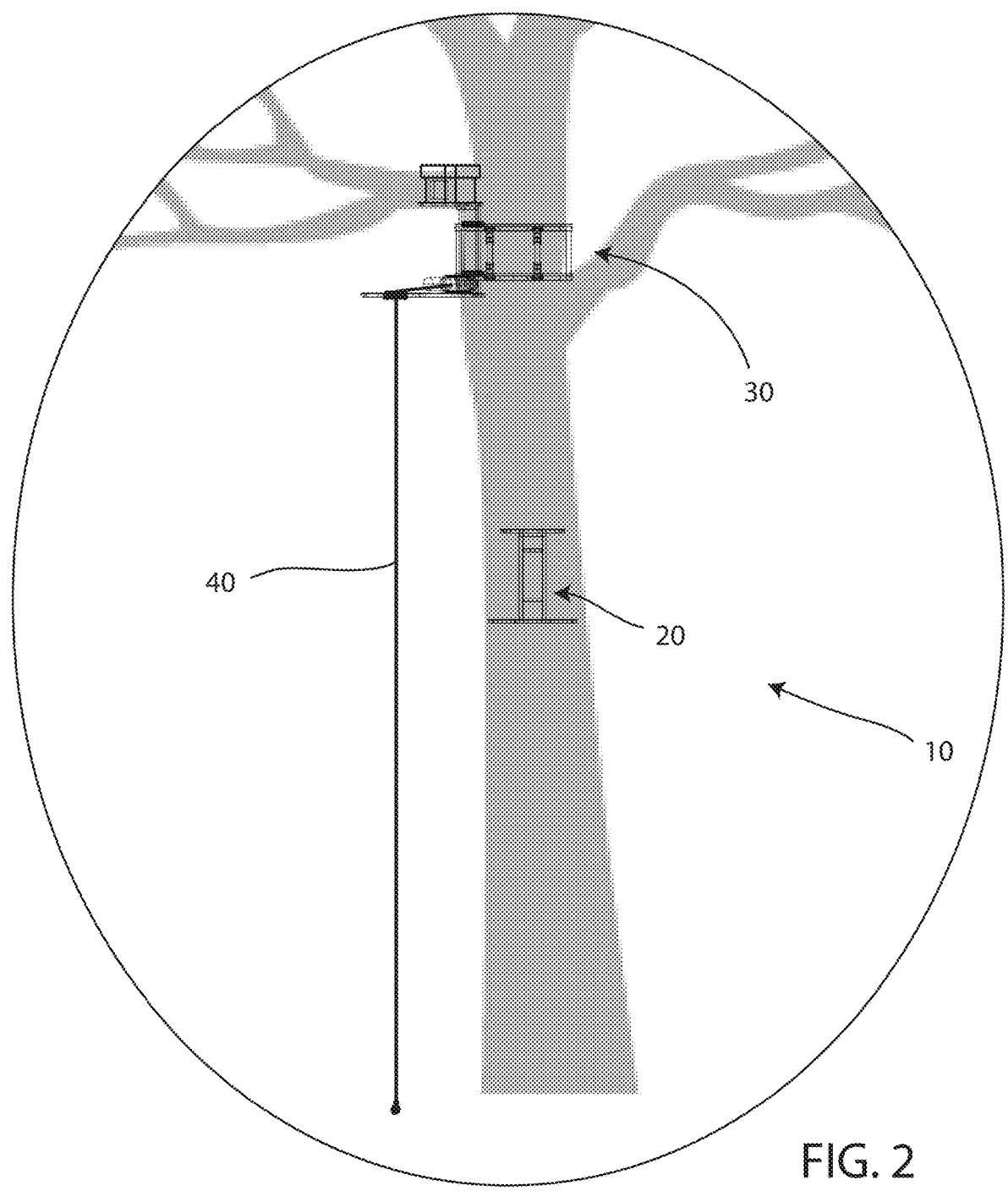
FIG. 2 is a close-up schematic diagram of a tree stand lift system installed in a tree, showing a hoist cable in a descended position.

Referring now to the drawings, FIG. 1 is a schematic diagram of a tree stand lift system 10 installed in a tree 2. The tree stand lift system 10 includes a hunting platform assembly 20, a hoist assembly 30, and a hoist cable 40. In the depicted figure the hoist cable 40 is shown in a descended position. This is the position that would typically be experienced when a user is going to connect onto the hoist cable 40. FIG. 2 is a close-up schematic diagram of a tree stand lift system 10 installed in a tree, showing a hoist cable 40 in a descended position from the hoist assembly 30.

Figure 3:
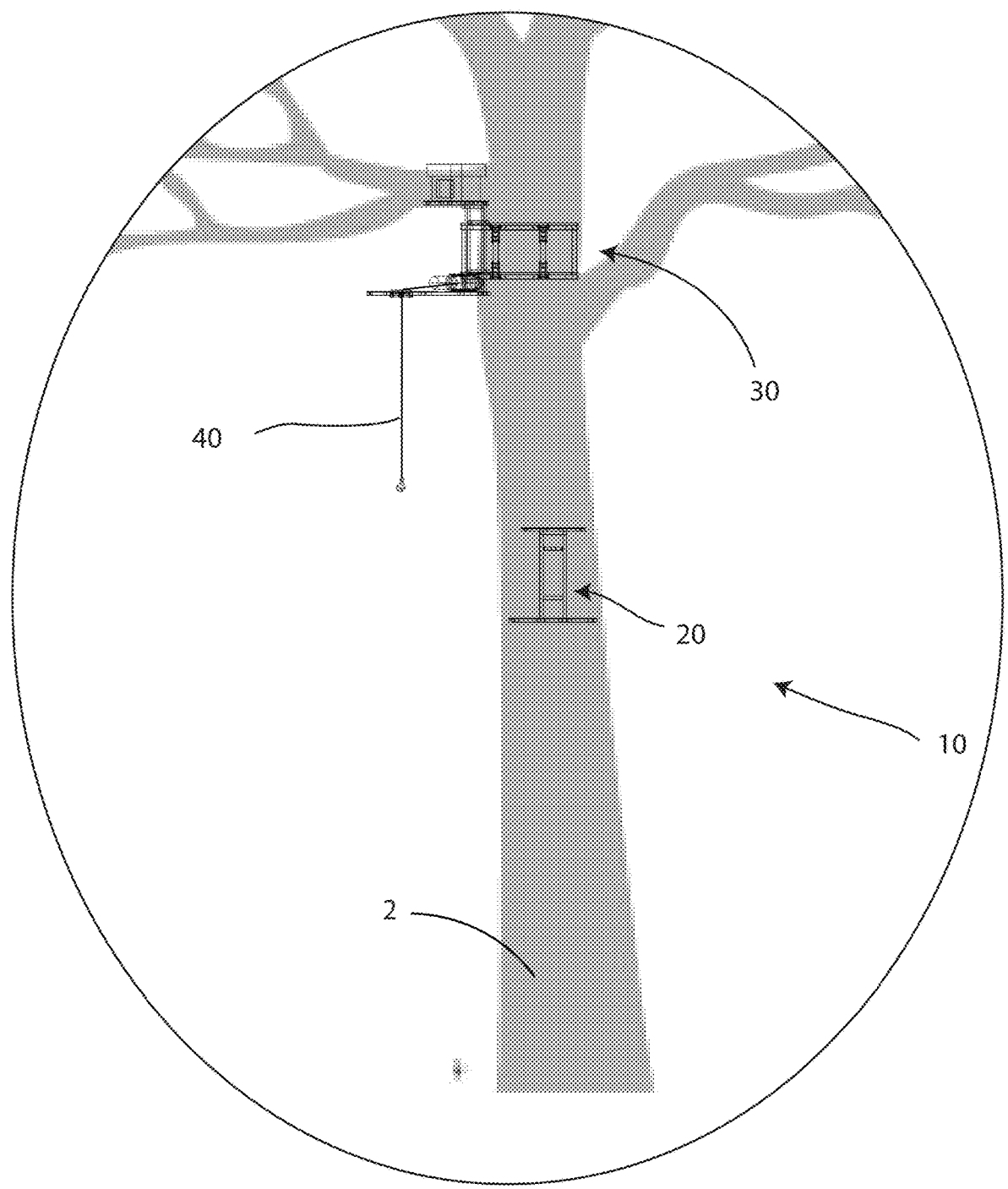
FIG. 3 is a close-up schematic diagram of a tree stand lift system installed in a tree, showing a hoist cable in an ascended position.
Figure 11:
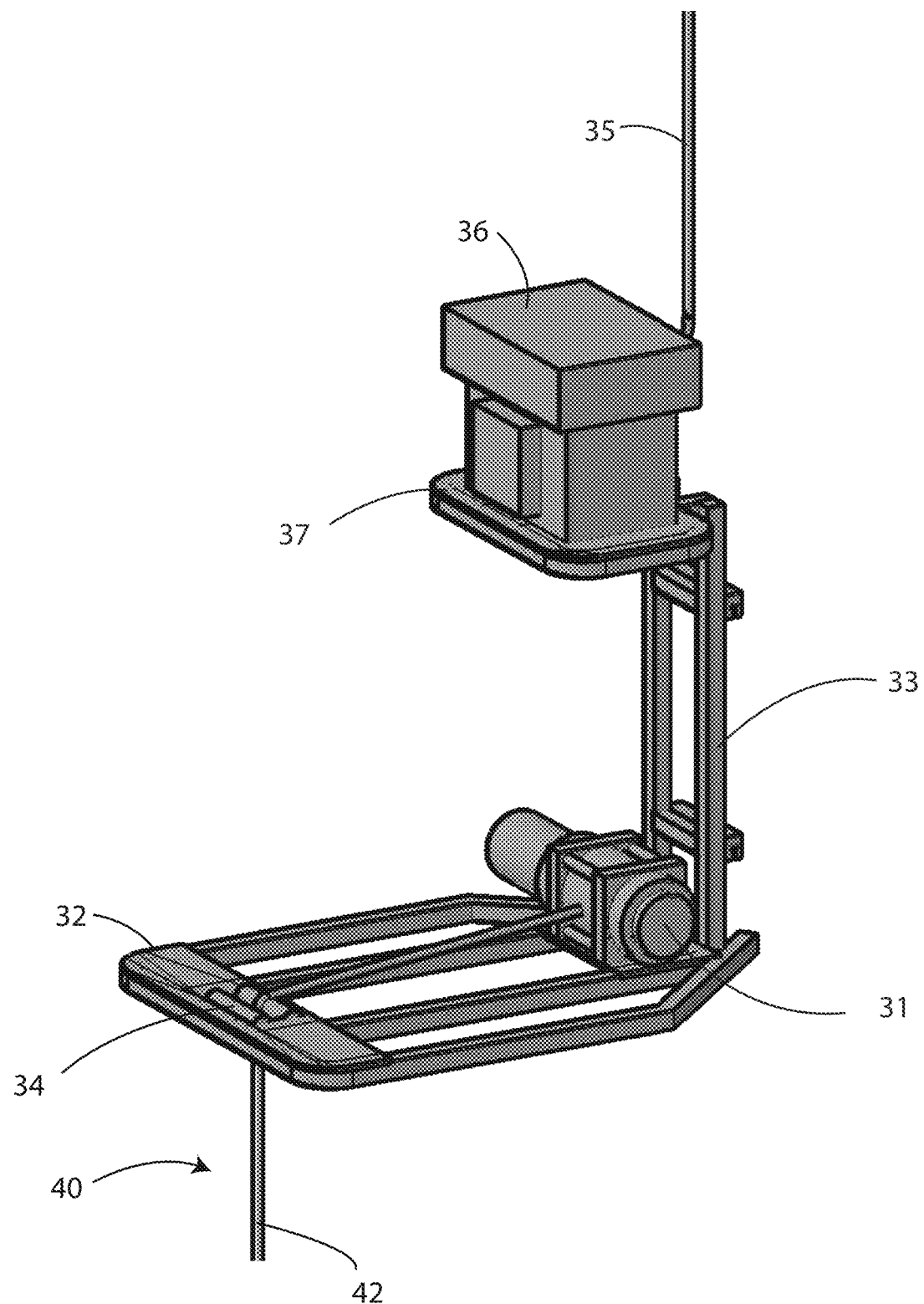
FIG. 11 is a closer front perspective view of a hoist assembly.

FIG. 3 is a close-up schematic diagram of a tree stand lift system 10 installed in a tree 2, showing a hoist cable 40 in an ascended position close to the hoist assembly 30. This arrangement is what the system will often look like when not in use: the hoist cable is elevated up near the hoist assembly 30, but a user is not in the on the hunting platform assembly 20. The tree stand lift system 10 often includes a remote-control function that allows the hoist assembly 30 to be controlled from the ground by a user, generally a user holding a radio frequency or infrared controller. The hoist assembly 30 includes a receiver (shown in FIG. 11) that communicates with controller to raise and lower the hoist cable 40. When not in use the user can retract the hoist cable up into a tree, which avoids having other people from easily interfering with or damaging the hoist cable and other system components. Once a user with the controller approaches the tree stand they can lower the hoist cable.

Figure 4:
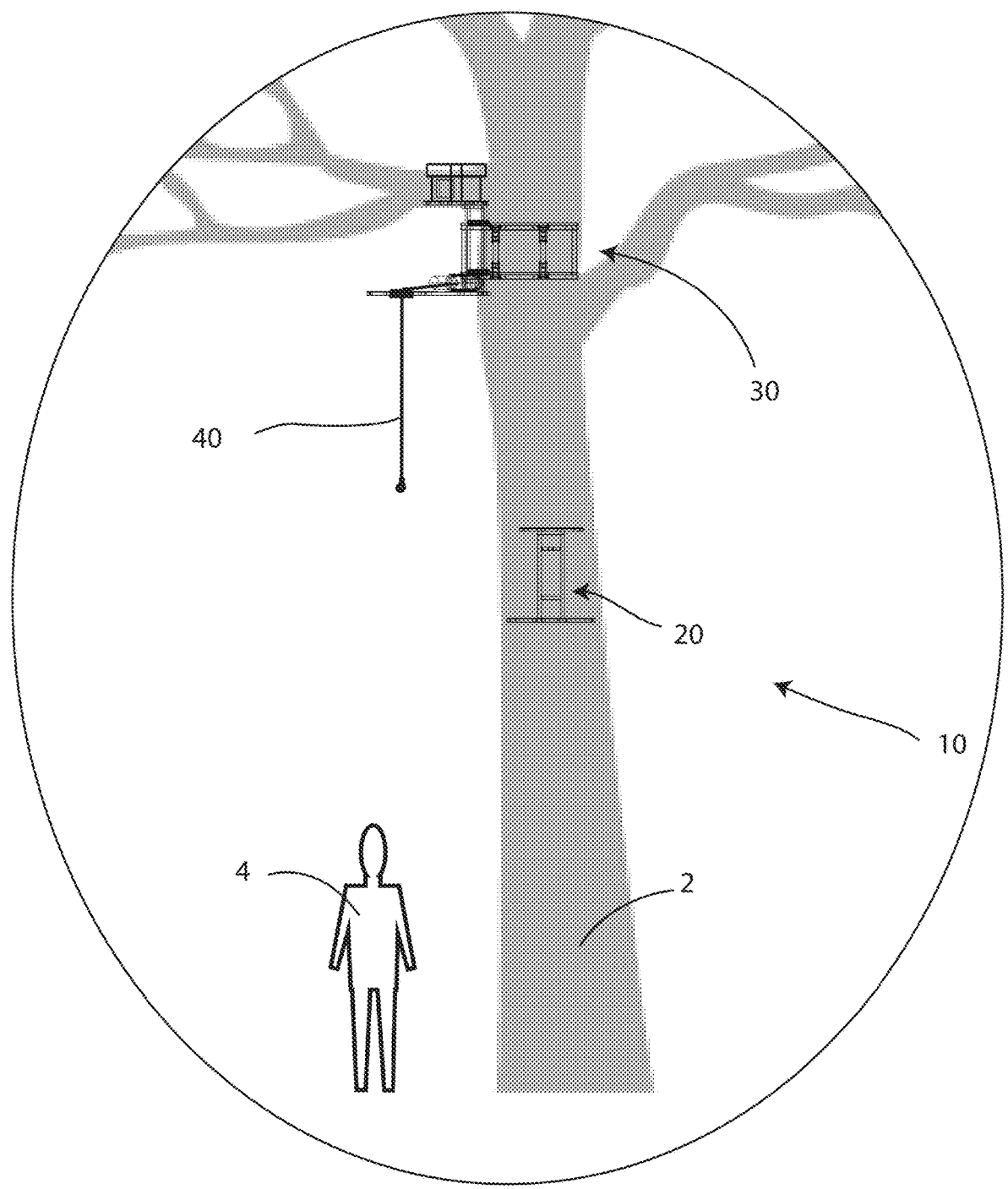
FIG. 4 is a close-up schematic diagram of a tree stand lift system installed in a tree, showing a hoist cable in an ascended position with a person at the base of the tree lift system before ascending to the tree stand.
Figure 5:
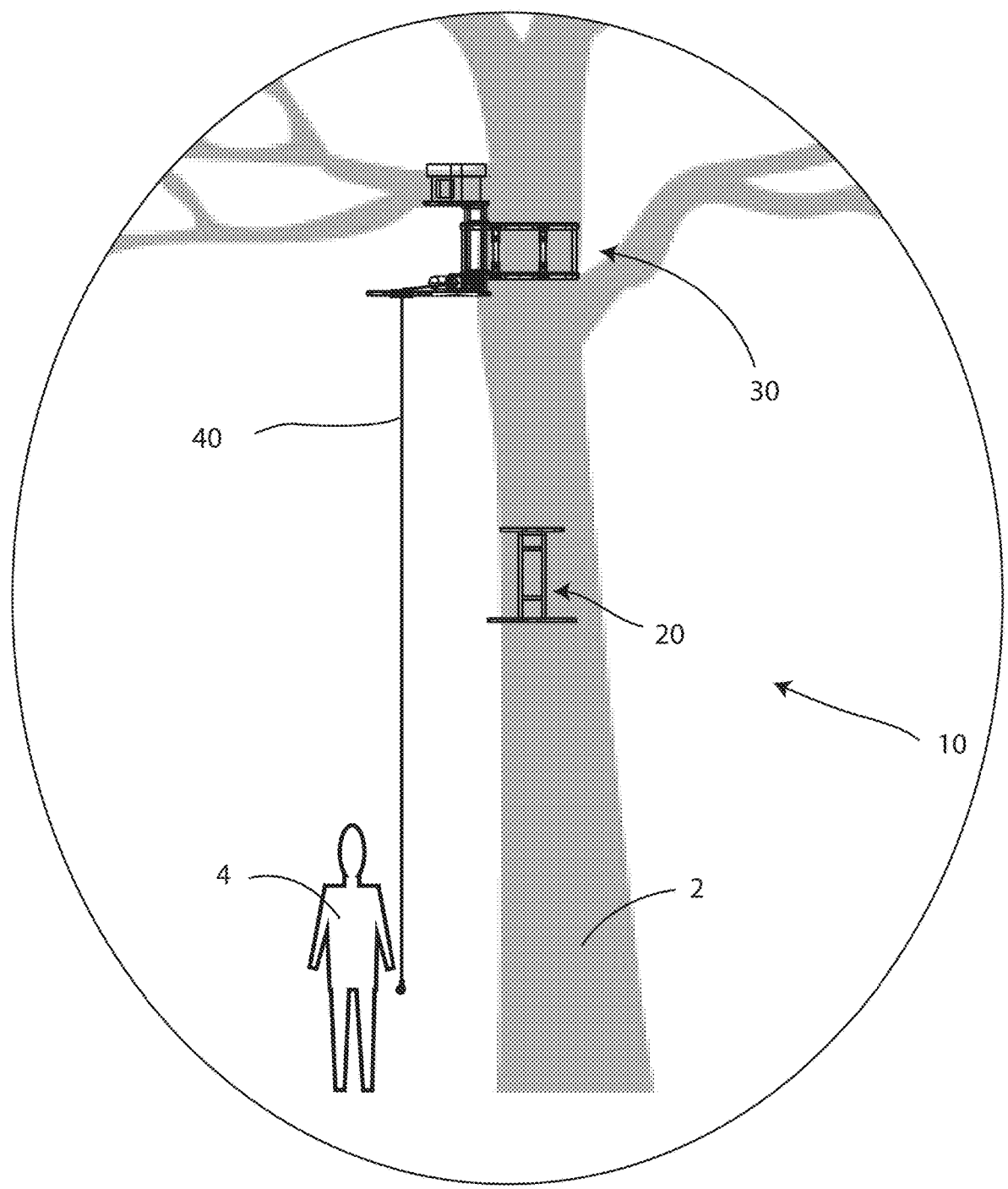
FIG. 5 is a close-up schematic diagram of a tree stand lift system installed in a tree, showing a hoist cable in a descended position with a person at the base of the tree lift system before ascending to the tree stand.
Figure 6:
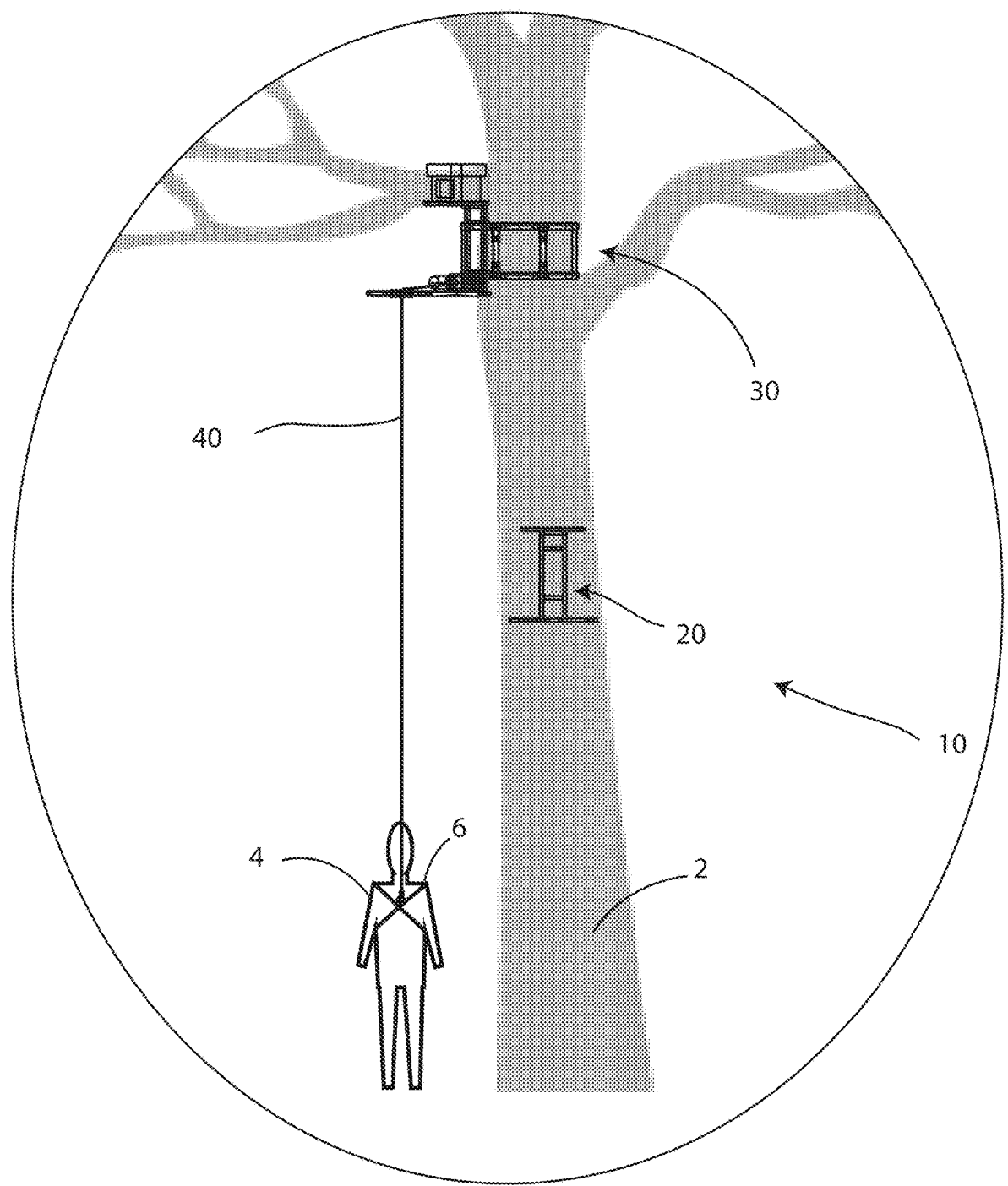
FIG. 6 is a close-up schematic diagram of a tree stand lift system installed in a tree, showing a hoist cable in a descended position with a person at the base of the tree lift system and harnessed to the hoist cable, but before ascending to the tree stand.
Figure 7:
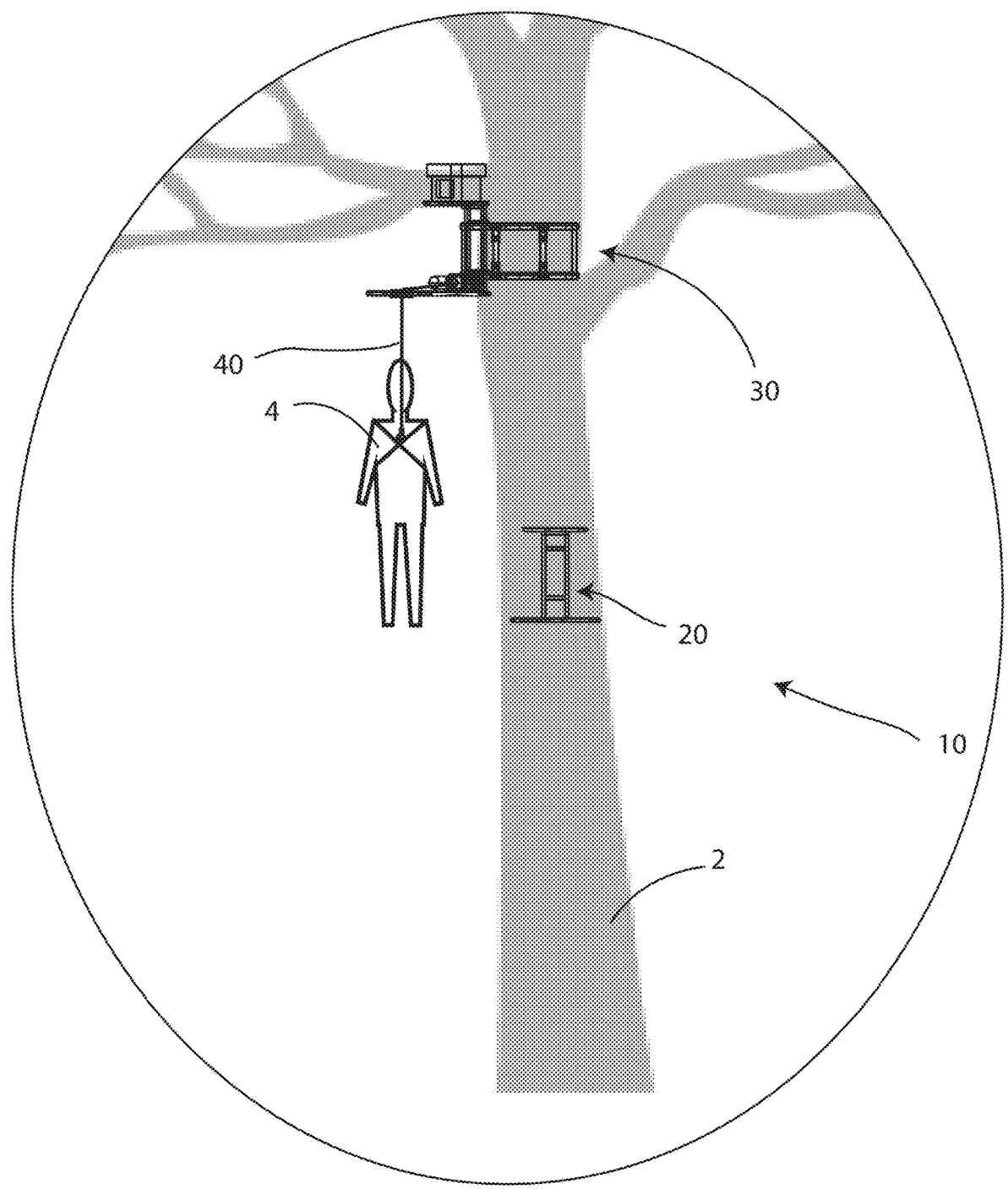
FIG. 7 is a close-up schematic diagram of a tree stand lift system installed in a tree, showing a hoist cable in an ascended position with a person ascended to the elevation of the tree stand seat and positioned to the side of the seat.
Figure 8:
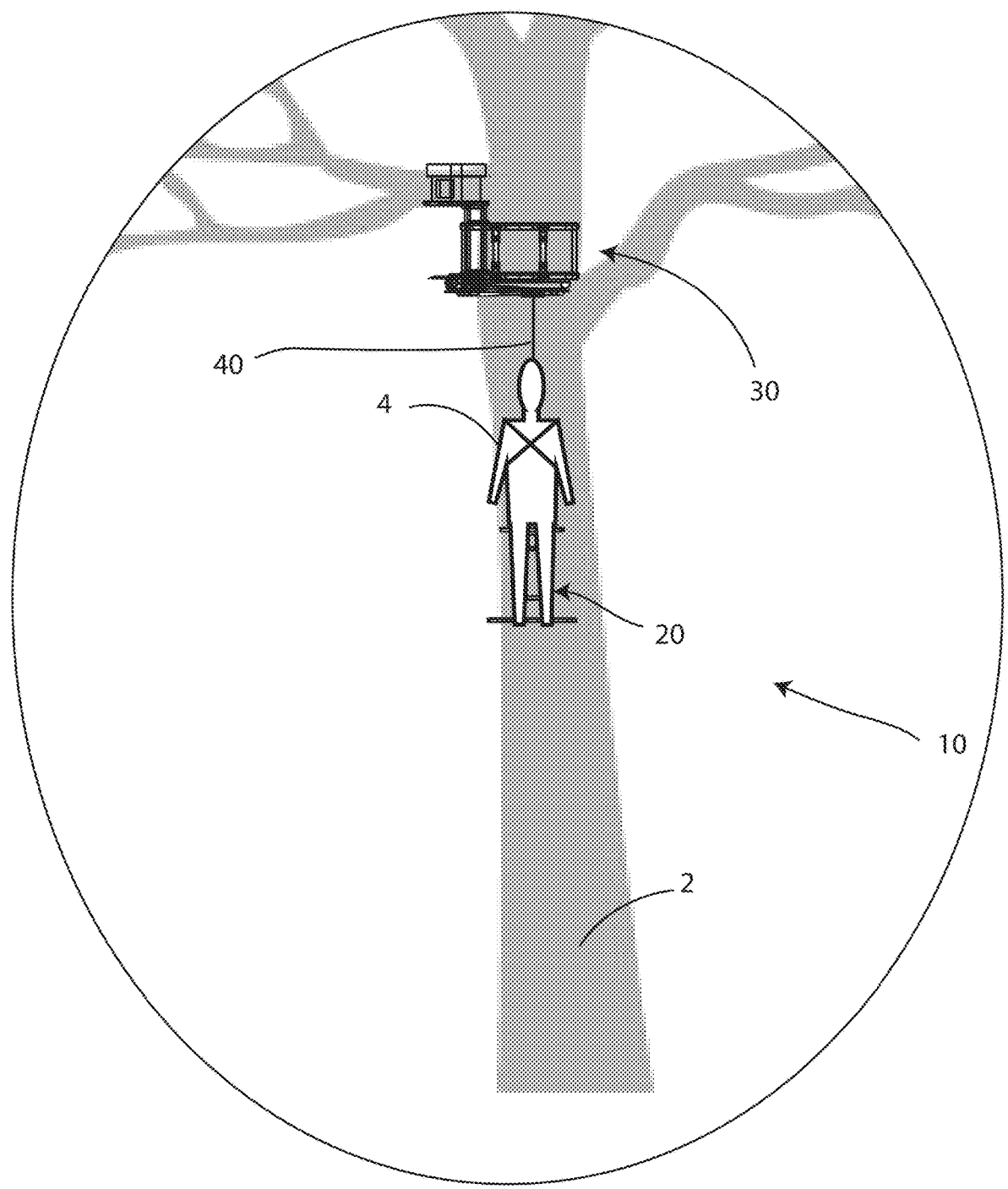
FIG. 8 is a close-up schematic diagram of a tree stand lift system installed in a tree, showing a hoist cable in an ascended position with a person ascended to the elevation of the tree stand seat and positioned on the seat.

FIG. 4 is a close-up schematic diagram of the tree stand lift system 10 installed in a tree 2, showing the hoist cable 40 in an ascended position with a person at the base of the tree lift system before ascending to the tree stand. The person 4 uses a controller (not shown) to drop the end of the hoist cable, and as shown in FIG. 5, and then connects the hoist cable 40 to a harness 6 as shown in FIG. 6. Thereafter the user controls the hoist assembly 30 by means of a controller (not shown) that typically wirelessly controls the raising and lower of the hoist cable 40. FIG. 7 shows the hoist cable in an ascended position with the user ascended to the elevation of the hunting platform assembly 20 (containing as seat and platform for standing) and positioned to the side of the hunting platform. The design of the tree stand lift system is such that it can lift a person up to the side of the hunting platform assembly 20, and then once the user is at the level of the hunting platform assembly 20 the user can slide over to be on top of the hunting platform assembly, as shown in FIG. 8. This ability to slide or pivot the hoist assembly 30 (in particular the location of the hoist cable) is very useful because it avoids having the hoist cable 40 rub up against the hunting platform assembly 20, while still allowing easy access to the hunting platform assembly 20. It will be appreciated, and is discussed below, how the hoist assembly 30 can be configured with a great deal of flexibility to adapt to various types and shapes of trees, allowing the hoist cable 40 to be drawn up from either side of the hunting platform assembly 20 (in some constructions), and to be installed on trees and structures that are perfectly vertical, as well as tilted forward or backward.

Figure 9:
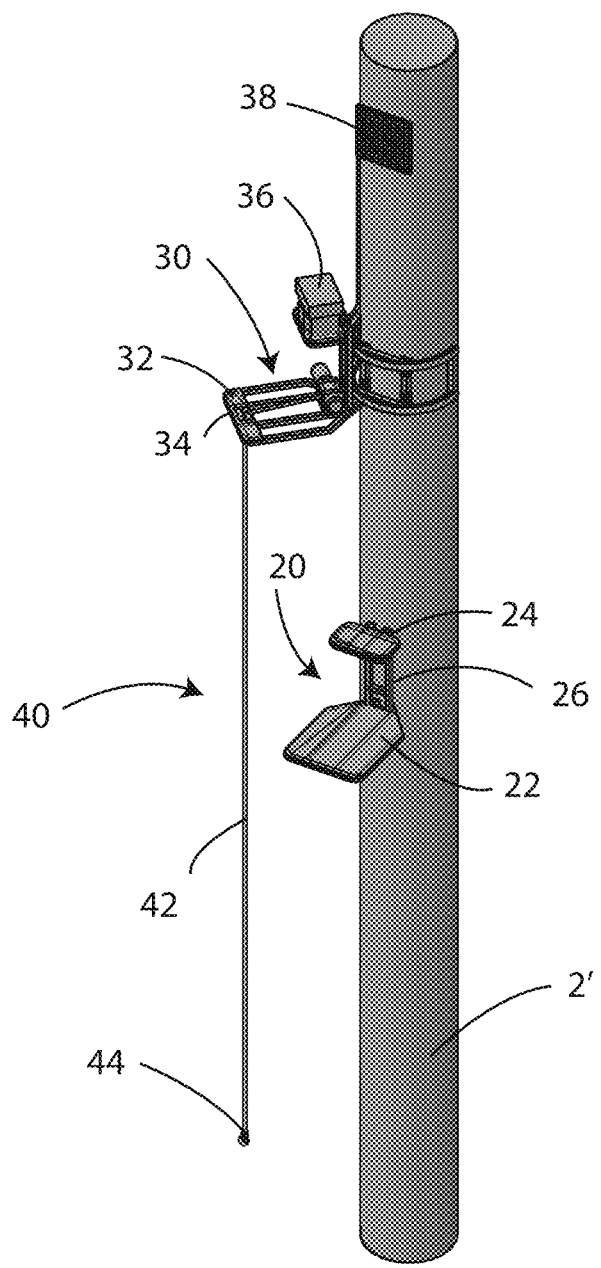
FIG. 9 is a perspective diagram of components tree stand lift system installed on a cylindrical object, showing a hoist cable in a descended position.

FIG. 9 is a perspective diagram of components of the tree stand lift system 10 installed on a cylindrical object 2', showing a hoist cable in a descended position. The cylindrical object 2' is best understood as a simplification of a tree trunk, and it will be understood that in most installations the cylindrical object 2' would be less uniform in shape. The tree stand lift system includes a hunting platform assembly 20, a hoist assembly 30, and a hoist cable 40. The hunting platform assembly 20 in this depicted embodiment has a first platform 22 for standing and a second platform 24 for sitting. The first platform 22 is typically significantly larger than the second platform 24, since a user generally needs to be able to stand on the first platform while only sits on the second platform 24. In certain embodiments the first platform 22 is at least twice as long as the second platform 24 (length being measured as the distance from the back of the platform adjacent to a cylindrical object 2' to the portion of the platform farthest from the cylindrical object 2'). In some embodiments the first platform 22 is at least three times as long as the second platform 24. The first platform 22 and second platform 24 are often similar in width (with width being the top surface of the platform measured perpendicular to the length of the platform). In some implementations, however, it is still desirable to have a first platform 22 that is slightly wider than the second platform 24. For example, in some implementations the first platform 22 is has a width that is 110 percent of the width of the second platform, while in other implementations it is at least 120 percent, at least 130 percent, at least 140 percent or at least 150 percent greater in width. Thus, generally the first platform 22 is at least 150 percent of the length of the second platform 24, and at least 100 percent of the width of the second platform 24. In some implementations the first platform 22 is at least 200 percent of the length of the second platform 24, and at least 150 percent of the width of the second platform 24. In some implementations the first platform 22 is at least 200 percent of the length of the second platform 24, and at least 125 percent of the width of the second platform 24. In some implementations the first platform 22 is at least 300 percent of the length of the second platform 24, and at least 150 percent of the width of the second platform 24. In some implementations the first platform 22 is at least 250 percent of the length of the second platform 24, and at least 100 percent of the width of the second platform 24.

The first platform 22 and second platform 24 are generally connected by a coupling member 26 (such as a metal frame). In some embodiments the second platform 24 for sitting can be rotated up to allow a person to stand more easily on the first platform 22. Thus, the second platform can be used in either a down position (for sitting) or an up position (for standing). However, the first platform 22 does not generally rotate into an upward position because allowing such rotation would risk having the platform tilt up when a user is being lifted up onto it (if there is an upward force). Thus, stability of the first platform 22 is often more important than ability to adjust it, while the second platform 24 is often adjustable.

Positioned above the hunting platform assembly 20 is the hoist assembly 30, which includes a hoist platform 32. The end of the hoist platform 32 generally contains a roller 34 over which the hoist cable 40 descends. Hoist cable 40 has a length 42, with an end 44. The end 44 of the hoist cable 40 will typically have a loop for securely fastening to a harness on a user, typically by means of a carbineer or the like.

The hoist assembly 30 also includes a battery 36 which powers the hoist motor (not labeled), and this battery 36 can be solar powered in some applications, such as by small solar panel 38. Note that generally the battery 36 is held up by the hoist assembly 30, but it is possible to have the battery be positioned closer to the ground and then have a power cable up to the hoist motor, but such constructions are less desirable than the one shown because the cabling can interfere with movement of the hoist assembly 30 from a position offset from the hunting platform assembly 20 to a position above the hunting platform assembly 20. In the depicted figure the hoist cable 40 is shown in a descended position. This is the position that would typically be experienced when a user is going to connect onto the hoist cable 40.

Figure 10:
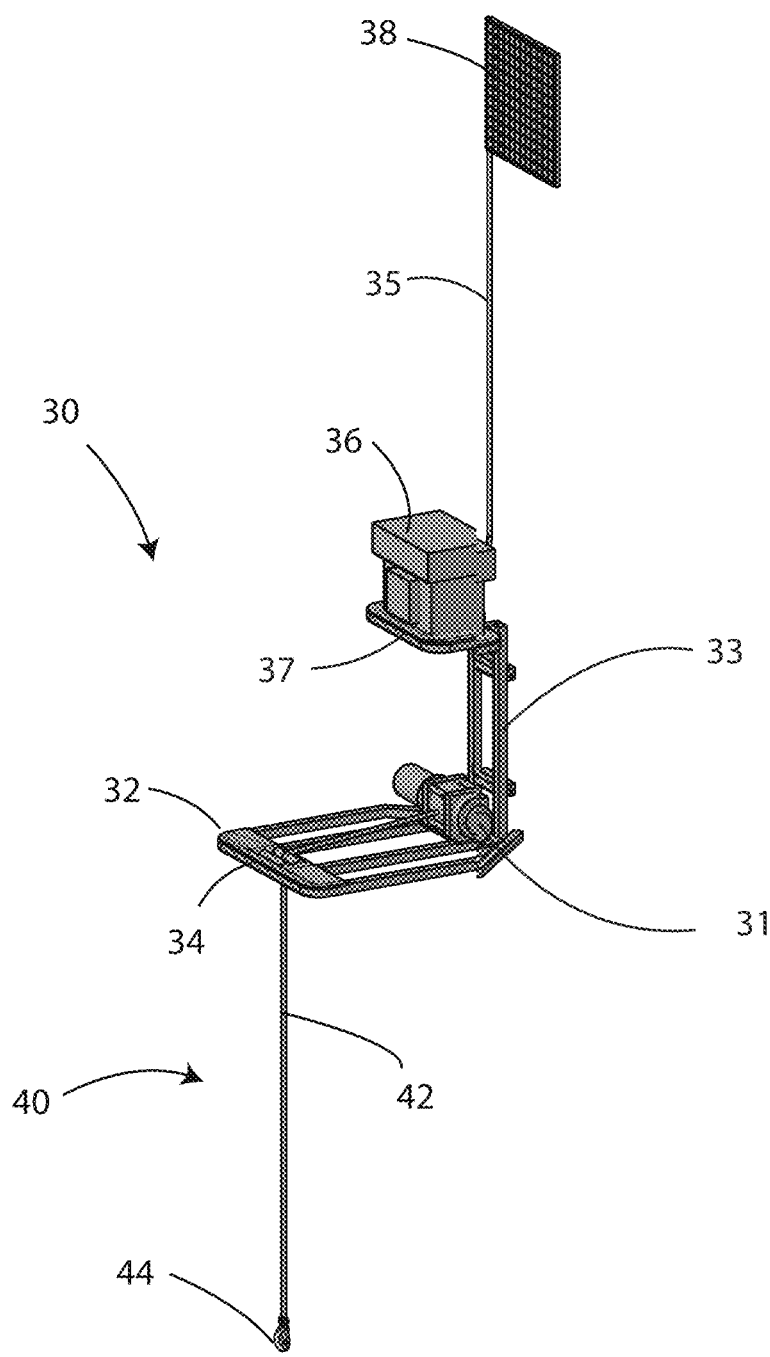
FIG. 10 is a front perspective view of a hoist assembly.
Figure 12:
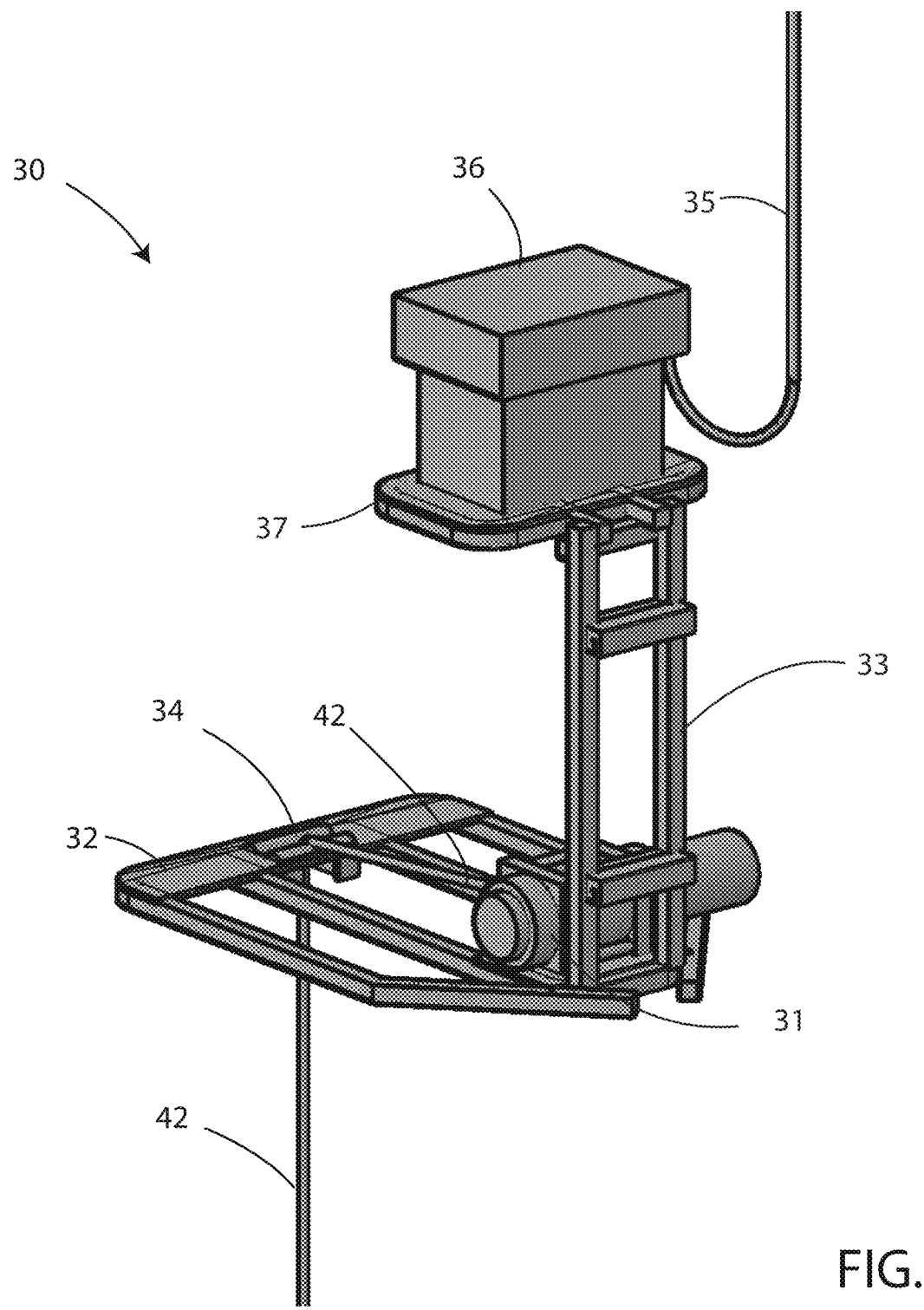
FIG. 12 is a rear perspective view of a hoist assembly.

FIG. 10 shows the hoist assembly 30 in greater detail from FIG. 9. The hoist assembly 30 also includes a battery 36 which powers the hoist motor (not labeled), and this battery 36 is solar powered by small solar panel 38 that is connected by conductor 35 to battery 36. The battery 36 is on a platform 37. Furthermore, the hoist 31 itself is shown, including a motor and reel or spool. These components are secured together into a single unit by means of a mounting bracket 33. In this embodiment only, the small solar panel 38 and conductor 35 are not rigidly secured to the mounting bracket 33. These features are shown in even greater detail in FIG. 11, with a rear perspective view in FIG. 12. As show in in FIG. 12, the hoist platform 32 is generally of an open construction made of steel or aluminum (or other) bars. This reduces weight and also allows a relatively clear view of the sky above. Also, this construction provides for a hoist platform 32 that is less visible from below. Thus, it is often desirable that the hoist platform 32, when viewed from below, is at least 50 percent open (in other words, can be seen through)), alternatively at least 60 percent open, at least 70 percent open, or at least 80 percent open). In addition, it is generally desired that the structure of the hoist platform 32, to the extent it is made of elongate members (such as members 32A), that these members substantially radiate out from the cylindrical object 2' so as to resemble branches.

Figure 13:
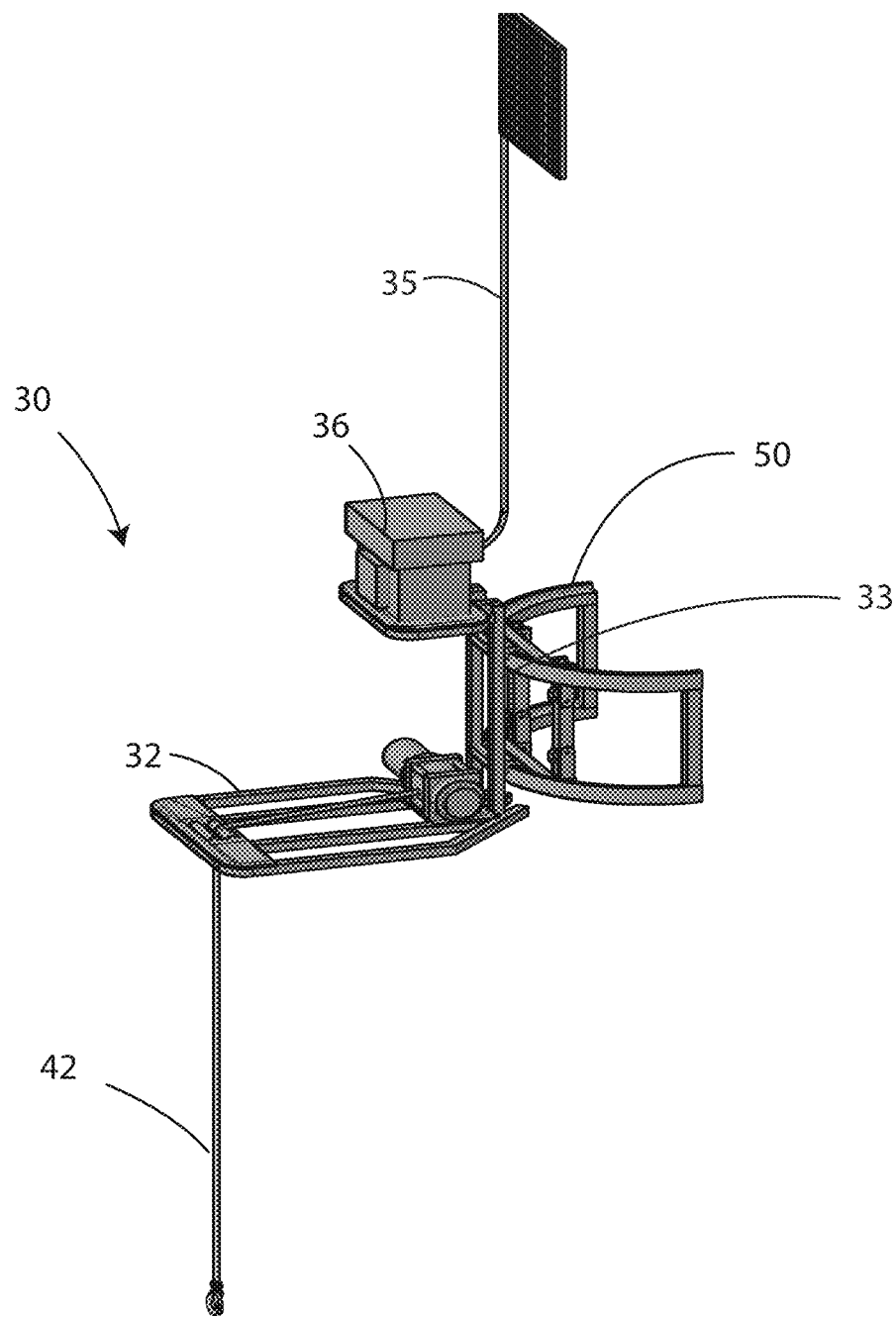
FIG. 13 is a perspective view of hoist assembly secured to base assembly, the base assembly for securing the hoist assembly to a tree and also for allowing movement of the hoist assembly along a pair of rails on the base assembly.
Figure 14:
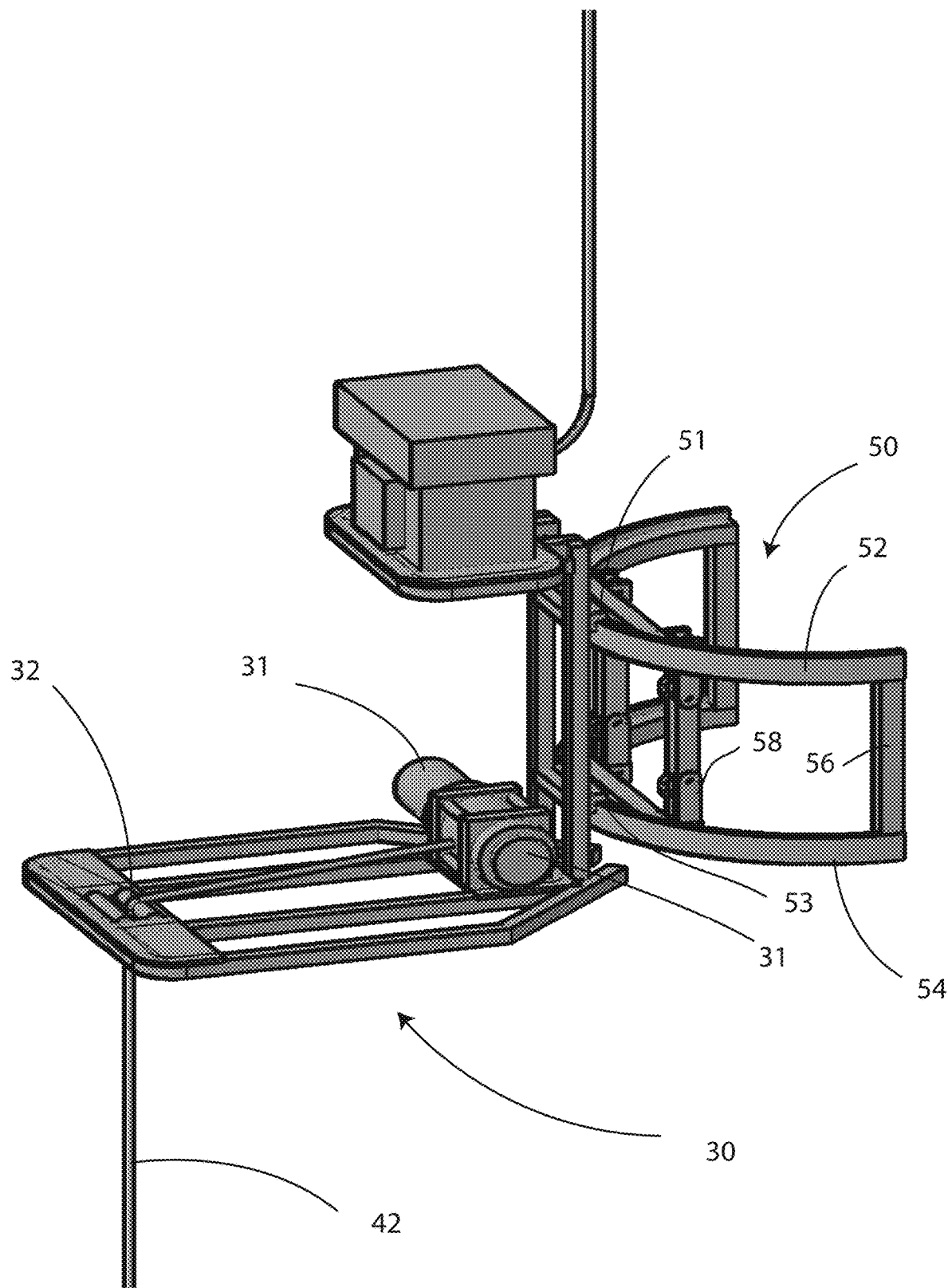
FIG. 14 is a close-up perspective view of hoist assembly secured to base assembly.

FIG. 13 shows this hoist assembly 30 now secured to a base assembly 50. This hoist assembly 30 is shown in a curved configuration for wrapping part way around a tree (not shown). The mounting bracket 33 includes top and bottom couplers 51 and 53 (see FIG. 14) that hook onto the top rail 52 and bottom rail 54 of the base assembly 50. The top rail 52 and bottom rail 54 are secured to one another by, for example, connecting members 56. The mounting bracket 33, in particular the bottom couplers 51 and 53, slide along the top rail 52 and bottom rail 54 to position the hoist assembly 30. The top rail 52 and bottom rail 54 are generally installed in a nearly horizontal position to allow for easy movement of the hoist assembly to different positions (above the hunting platform assembly or to the side of the hunting platform assembly).

The top rail 52 and bottom rail 54 are typically curved, and in some implementations form an arc that is a portion of a circle so that rotation travels a predicable path around a single central axis. Typically, so as to provide solid support, the top rail 52 and bottom rail 54 are at least 12 inches apart, generally from 10 to 20 inches apart, often from 8 to 24 inches apart. The area between the top rail 52 and bottom rail 54 is generally open, again providing a low-visibility device. Also, the bottom coupler 51 and bottom coupler 53 are optionally elongate so that they can make contact with an extended portion of the top rail 52 and bottom rail 54.

Figure 15A:
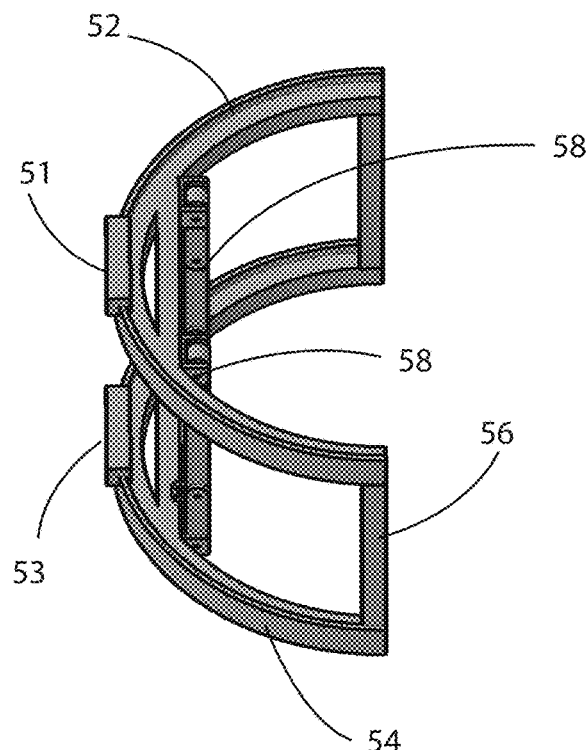
FIG. 15A a base assembly configured for being secured to a vertical portion of a tree trunk.
Figure 15B:
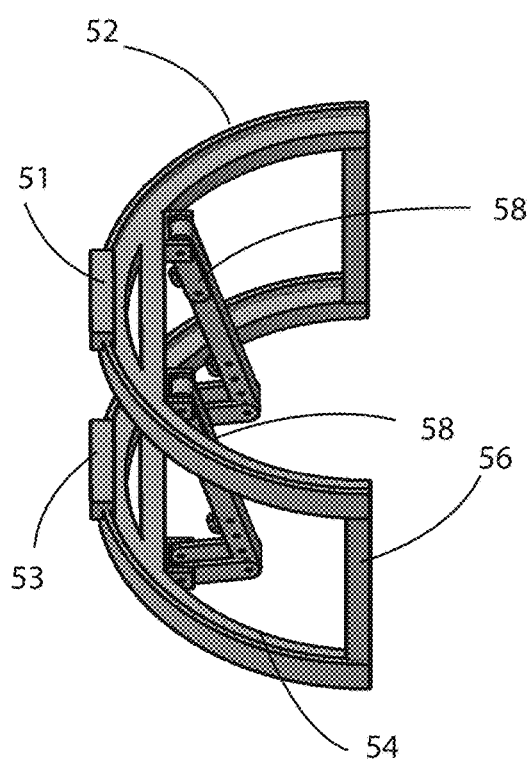
FIG. 15B a base assembly configured for being secured to a portion of a tree trunk that is inclined toward the tree stand assembly.
Figure 15C:
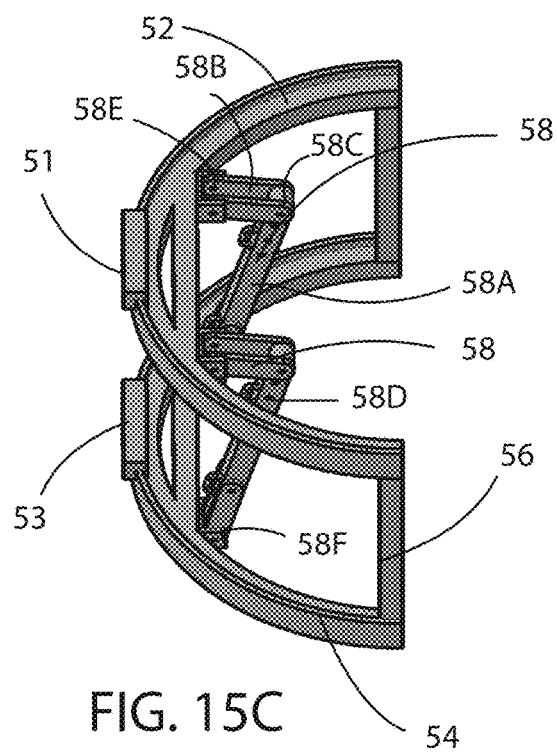
FIG. 15C a base assembly configured for being secured to a portion of a tree trunk that is inclined away from the tree stand assembly.

The base assembly 50 is designed to be adjustable for numerous shapes of trees, as shown in FIGS. 15A to 15C, and this adjustment can be accomplished using the adjusting brackets 58. The adjusting brackets 58 can be independently configured to have various orientations for different types of trees. For example, the adjusting brackets 58 in FIG. 15A are arranged for a perpendicular tree trunk at the mounting position, while the adjusting brackets 58 in FIG. 15B are arranged for a tree trunk that bends toward the tree stand, and the adjusting brackets 58 in The adjusting brackets 58 generally include a first elongate portion 58A and a shorter portion 58B; and these portions meet at intersection 58C. The elongate portion 58A makes contact with the cylindrical object 2', typically along most or all of the length of elongate potion 58A. There are generally two elongate portions 59A, and each is independently adjustable. The adjusting brackets can have multiple holes 58D in the elongate portion 58A, allowing for adjusting of the intersection 58C to change the orientation of the elongate portion 58A. The adjusting brackets 58 are design as well to have pivot points at the top pivot 58E and bottom pivot 58F, although those top pivot 58E and bottom pivot 58F only pivot during installation adjustment, but do not pivot when installed. By making adjustments to the various points and lengths the elongate portion 58A can be adjusted to perpendicular to the ground, or inclined either positively (as in FIG. 15C) or negatively (as in FIG. 15B). Due to the construction the potential adjustment in a positive or negative direction is generally the same. Thus, the elongate portion 58A is readily adjustable to many different angles, but is rigid (does not adjust) once installed).

FIG. 15C are arranged for a tree trunk that bends away from the tree stand. It will be understood that generally both of the adjusting brackets 58 will be the same in orientation, but it is possible to have them be different. Also, it will be understood that although it can take some time to configure the adjusting brackets 58, once set the base assembly is easily installed time after time into a tree while providing a very solid contact and engagement with the tree.

Additional functionality can include enhanced controls and control functions for moving the hoist cable 40 up and down. For example, the hoist cable 40 can be controlled by a dedicated remote control, or can be controlled by a multi-purpose device such as a cell phone using Bluetooth™ functionality. In this way multiple controllers are possible and can be shared by different users who will be visiting the tree stand at different times. Also, automatic functions can be created, such as a "safety" function wherein when the hoist cable is used as a safety cable up in the tree stand with a small amount of slack (say 5 feet), in which case it will catch a user who slips out of the stand. An automatic feature can be used wherein after detection of a fall (such as by a hard and continuous pull on the hoist cable 40) results in the end of the hoist cable being gradually lowered to the ground. In this manner the system doesn't leave a person hanging in the air without the ability to be easily lowered (such as if the remote is lost or out of reach). Similarly, in such a situation the system can sound an alarm upon lowering of the fallen person, such feature being activated after a preset amount of time, in the event the fallen person is disabled (such as from a heart attack).

While not shown, it will be appreciated that straps or other fasteners are used to secure the various components (hunting platform assembly, hoist assembly, base assembly . . . ) to the tree. Also, generally a ladder is used to first install the lift system into a tree, although the ladder is then not needed for subsequent use. It is possible, however, to use a ladder with the hoist assembly, in which case the hoist assembly can be used as a safety tether when going up and down the ladder (with an auto-tension setting to reel-in slack as desired) or the hoist can be used to bring gear up and down from the tree stand. Thus, the tree stand lift system is highly adaptable to many different use conditions and purposes.

It should be noted that, as used in this specification and the appended claims, the singular forms "a," "an," and "the" include plural referents unless the content clearly dictates otherwise. It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

We claim:

1. A tree stand lift system for elevating a person into a tree or other structure, the tree stand lift system comprising:
a hunting platform assembly for supporting a person;
a hoist assembly positioned above the hunting platform;

a hoist cable secured to the hoist assembly and positioned to lift a person from the ground up to the hunting platform;

wherein the hoist assembly comprises a hoist platform and the hoist platform includes mounting brackets for securing the hoist platform to a base assembly, the base assembly comprising at least two rails on which the hoist platform can travel.

2. The tree stand lift system of claim 1, wherein the platform assembly for supporting a person includes a first platform for standing and a second platform for sitting, the second platform for sitting located above the first platform for standing.

3. The tree stand lift system of claim 2, wherein the second platform for sitting is configured to pivot along an axis so it can make room for standing on the first platform for standing.

4. The tree stand lift system of claim 1, wherein the hoist assembly comprises a hoist platform.

5. The tree stand lift system of claim 1, wherein the hoist assembly comprises a roller over which the hoist cable travels.

6. The tree stand lift system of claim 1, wherein the hoist assembly comprises a battery.

7. The tree stand lift system of claim 6, wherein the battery is contained within an enclosure.

8. The tree stand lift system of claim 7, wherein the battery is connected to a solar charger.

9. The tree stand lift system of claim 1, wherein the hoist assembly comprises a hoist platform and the hoist platform includes mounting brackets for securing the hoist platform to a tree.

10. The tree stand lift system of claim 1, wherein the hoist assembly comprises a hoist platform and the hoist platform includes mounting brackets for securing the hoist platform to a base assembly, the base assembly comprising a means for moving or rotating the hoist platform relative to the hunting platform assembly.

11. The tree stand lift system of claim 1, wherein the hoist platform can slide along the rails to at least two positions: one above the hunting platform and one to the side of the hunting platform.

12. The tree stand lift system of claim 1, wherein the base assembly comprises curved rails, the curved rails configured to at least partially wrap around a tree trunk.

13. The tree stand lift system of claim 12, wherein the base assembly includes a means for adjusting the angle at which the base assembly connects to a tree trunk.

14. A tree stand lift system for elevating a person into a tree or other structure, the tree stand lift system comprising:
a hunting platform assembly for supporting a person;
a hoist assembly positioned above the hunting platform;
a hoist cable secured to the hoist assembly and positioned to lift a person from the ground up to the hunting platform;
wherein the hoist assembly comprises a hoist platform and the hoist platform includes mounting brackets for securing the hoist platform to a base assembly, the base assembly comprising at least one rail on which the hoist platform can travel;
wherein the base assembly comprises curved rails, the curved rails configured to at least partially wrap around a tree trunk; and
wherein the base assembly includes a means for adjusting the angle at which the base assembly connects to a tree trunk.

* * * * *